US012738660B2

(12) United States Patent
Tsai et al.

(10) Patent No.: US 12,738,660 B2
(45) Date of Patent: Sep. 15, 2026

(54) RADAR ANTENNA WITH DIRECTOR

(71) Applicant: CUBTEK INC., Zhubei City (TW)

(72) Inventors: Ching-Han Tsai, Hsinchu County (TW); Ching-Jui Chuang, Hsinchu County (TW); Hsien-En Li, Hsinchu County (TW)

(73) Assignee: CUBTEK INC., Zhubei City (TW)

( * ) Notice: Subject to any disclaimer, the term of this patent is extended or adjusted under 35 U.S.C. 154(b) by 256 days.

(21) Appl. No.: 18/415,307

(22) Filed: Jan. 17, 2024

(65) Prior Publication Data

US 2025/0233314 A1 Jul. 17, 2025

(51) Int. Cl.

*H01Q 13/18* (2006.01)
*H01Q 1/24* (2006.01)
*H01Q 21/06* (2006.01)

(52) U.S. Cl.

CPC ............. *H01Q 13/18* (2013.01); *H01Q 1/247* (2013.01); *H01Q 21/064* (2013.01)

(58) Field of Classification Search

CPC ....... H01Q 13/18; H01Q 1/247; H01Q 21/064
See application file for complete search history.

(56) References Cited

U.S. PATENT DOCUMENTS

| | | | | |
|---|---|---|---|---|
| 6,366,254 | B1 * | 4/2002 | Sievenpiper | H01Q 21/20 343/770 |
| 11,909,122 | B2 * | 2/2024 | Kawasaki | H01Q 13/02 |
| 12,401,131 | B2 * | 8/2025 | Seo | H01Q 1/526 |
| 2005/0270247 | A1 * | 12/2005 | Kitamori | H01Q 3/04 343/754 |
| 2021/0320415 | A1 * | 10/2021 | Calzuola | H01Q 13/0258 |
| 2023/0420857 | A1 * | 12/2023 | Garcia Tejero | G01S 7/027 |
| 2024/0079789 | A1 * | 3/2024 | Alexanian | H01Q 21/005 |

* cited by examiner

*Primary Examiner* — Nazra Nur Waheed
(74) *Attorney, Agent, or Firm* — Birch, Stewart, Kolasch & Birch, LLP

(57) ABSTRACT

A radar antenna with director includes a first main body and a second main body. The first main body has a receiving channel and two first transmission channels. The receiving channel receives a signal source, and a splitter provided between the two first transmission channels splits the signal source into two first radiative signals and transmits the same through the first transmission channels. The second main body is located at one side of the first main body. The second main body has two second primary transmission channels, and two second secondary transmission channels flanking the two second primary transmission channels. The second primary transmission channel each has a primary receiving hole. The second secondary transmission channel and the corresponding second primary transmission channel are communicated through a coupling hole. The first radiative signal is split into two second radiative signals through coupling by the coupling hole.

18 Claims, 10 Drawing Sheets

RADAR ANTENNA WITH DIRECTOR

BACKGROUND OF THE INVENTION

1. Technical Field

The present invention relates to metal waveguide antennas for radars, and more particularly to a radar antenna with director.

2. Description of Related Art

Generally, when transmitting signals, a waveguide antenna splits a single primary signal source into multiple secondary signal sources through multiple channels to achieve multi-channel transmission, thereby amplifying its signal output.

Existing waveguide antennas usually split signal sources by means of collision splitting. For example, a waveguide antenna may comprise a first transmission channel and two second transmission channels connected thereto. When a signal source is transmitted from the first transmission channel to the second transmission channels, the primary signal source hits a bifurcation point between the first transmission channel and the second transmission channels, and gets split into two secondary signal sources.

However, such collision not only disperses energy of the signal source, bringing about undesirable large sidelobes. In addition, the signal source tends to have energy loss due to collision, leading to decreased strength of the output signal.

SUMMARY OF THE INVENTION

The primary objective of the present invention is to solve the problem of the existing waveguide antennas about excessively large sidelobes and decreased signal strengths.

For achieving the foregoing objective, one embodiment of the present invention provides a radar antenna with director, for working with a signal source for radiative transmission, the radar antenna comprising: a first main body, having a receiving channel and two first transmission channels communicated with the receiving channel, wherein the receiving channel is for receiving the signal source, and a splitter arranged between the two first transmission channels is for splitting the signal source into two first radiative signals and transmitting the two first radiative signals through the two first transmission channels, respectively; and a second main body, being located at one side of the first main body that has the two first transmission channels, and comprising two second primary transmission channels communicated with the two first transmission channels, respectively, and two second secondary transmission channels flanking the two second primary transmission channels, wherein each of the second primary transmission channels has one end thereof adjacent to the first main body has a primary receiving hole, which has a hole size equal to a hole size of each of the first transmission channels, and each of the second secondary transmission channels is communicated with the corresponding second primary transmission channel through a coupling hole, whereby each of the first radiative signals is split into two second radiative signals through coupling by the coupling hole, and the two second radiative signals are radiatively output in a direction away from the first main body through the second primary transmission channels and the second secondary transmission channels, respectively.

Thereby, with the coupling hole, the first radiative signal is coupled when laterally input and is split into the second radiative signals. This prevents energy dispersion and reduces energy loss during the process of coupling the first radiative signals, so as to decrease sidelobe strengths and maintain signal strengths.

DETAILED DESCRIPTION OF THE INVENTION

Figure 1:
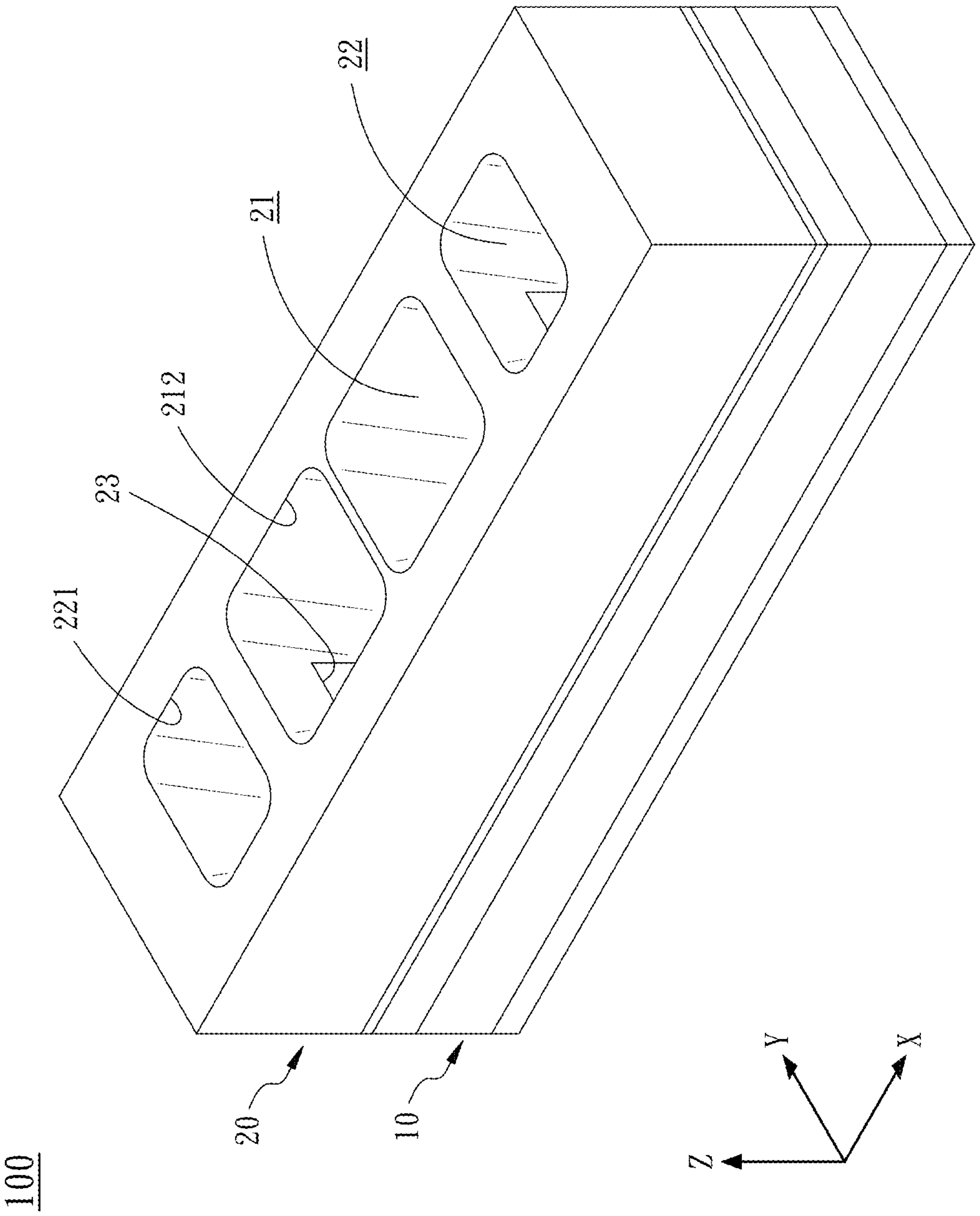
FIG. 1 is a perspective view of a radar antenna with director according to one embodiment of the present invention.

The following preferred embodiments when read with the accompanying drawings are made to clearly exhibit the above-mentioned and other technical contents, features, and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

FIG. 1 through FIG. 10 illustrate embodiments of the present invention. As shown, a radar antenna with director 100 is configured to work with a signal source S for radiative transmission. The radar antenna with director 100 comprises a first main body 10 and a second main body 20. Therein, the first main body 10 has its one side away from the second main body 20 provided with a signal transmitter (not shown). The signal transmitter is for transmitting the signal source S. In the embodiment of the present invention, the signal source S has a frequency between 75 GHz and 78 GHz. Particularly, the frequency of the signal source S may be 75, 75.5, 76, 76.5, 77, 77.5, or 78 GHz.

As shown in FIG. 1 through FIG. 6, in the present invention, the direction parallel to the length direction of the second main body 20 is defined as an X-axis direction, and the direction parallel to the width direction of the second main body 20 is defined as a Y-axis direction, while the direction perpendicular to the length direction and the width direction of the second main body 20 is defined as a Z-axis direction.

The first main body 10 has a receiving channel 11 and two first transmission channels 12 communicated with the receiving channel 11. The receiving channel 11 is for receiving the signal source S. Between the two first transmission channels 12 there is a splitter 13 for splitting the signal source S into two first radiative signals S1 and performing signal transmission through the two first transmission channels 12.

As shown in FIG. 1 through FIG. 6, in the present invention, the splitter 13 has a raised secondary splitting portion 131 on each side thereof along the X-axis direction. Thereby, the two first radiative signals S1 as the result of splitting can have close phases, thereby preventing phase errors that degrade subsequent signal transmission.

As shown in FIG. 1 through FIG. 6, the receiving channel 11 at its one end away from the second main body 20 has a signal receiving hole 111. The signal receiving hole 111 defines a first hole length L1 along the X-axis direction. The first hole length L1 is between 2 mm and 5 mm. Particularly, the first hole length L1 may be 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 mm. In the depicted exemplary embodiment, the frequency of the signal source S is 76.5 GHz. If the frequency is not 76.5 GHz, the first hole length L1 is between 0.5 and 1.28 wavelengths, and may be 0.5, 0.6, 0.7, 0.8, 0.9, 1.0, 1.1, 1.2 or 1.28 wavelengths. The signal receiving hole 111 defines a first hole width W1 along the Y-axis direction. The first hole width W1 is between 1 mm and 3 mm. Particularly, the first hole width W1 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3 mm. In the depicted exemplary embodiment, the frequency of the signal source S is 76.5 GHz. If the frequency is not 76.5 GHZ, the first hole width W1 is between 0.25 and 0.77 wavelengths, and may be 0.25, 0.3, 0.35, 0.4, 0.45, 0.5, 0.55, 0.6, 0.65, 0.7, 0.75 or 0.77 wavelengths. The receiving channel 11 defines a first transmission length H1 along the Z-axis direction. The first transmission length H1 is between 1 mm and 3 mm. Particularly, the first transmission length H1 may be 1, 1.125, 1.25, 1.375, 1.5, 1.625, 1.75, 1.875, 2, 2.125, 2.25, 2.375, 2.5, 2.625, 2.75, 2.875 or 3 mm. In the depicted exemplary embodiment, the frequency of the signal source S is 76.5 GHz. If the frequency is not 76.5 GHz, the first transmission length H1 is between 0.25 and 0.77 wavelengths, and may be 0.25, 0.3, 0.35, 0.4, 0.45, 0.5, 0.55, 0.6, 0.65, 0.7, 0.75 or 0.77 wavelengths.

As shown in FIG. 1 through FIG. 6, each of the first transmission channels 12 defines a second hole length L2 along the X-axis direction. The second hole length L2 is between 2 mm and 5 mm. Particularly, the second hole length L2 may be 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 mm. In the depicted exemplary embodiment, the frequency of the signal source S is 76.5 GHz. If the frequency is not 76.5 GHZ, the second hole length L2 is between 0.5 and 1.28 wavelengths, and may be 0.5, 0.6, 0.7, 0.8, 0.9, 1.0, 1.1, 1.2 or 1.8 wavelengths. Each of the first transmission channels 12 defines a second hole width W2 along the Y-axis direction. The second hole width W2 is between 1 mm and 4 mm. Particularly, the second hole width W2 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 or 4 mm. In the depicted exemplary embodiment, the frequency of the signal source Sis 76.5 GHz. If the frequency is not 76.5 GHz, the second hole width W2 is between 0.25 and 1.02 wavelengths, and may be 0.25, 0.3, 0.4, 0.5, 0.6, 0.7, 0.8, 0.9, 1.0 or 1.02 wavelengths. Each of the first transmission channels 12 defines a second transmission length H2 along the Z-axis direction. The second transmission length H2 is between 0.5 mm and 2 mm. Particularly, the second transmission length H2 may be 0.5, 0.6, 0.7, 0.8, 0.9, 1, 1.1, 1.2, 1.3, 1.4, 1.5, 1.6, 1.7, 1.8, 1.9 or 2 mm. In the depicted exemplary embodiment, the frequency of the signal source S is 76.5 GHz. If the frequency is not 76.5 GHz, the second transmission length H2 is between 0.128 and 0.5 wavelengths, and may be 0.128, 0.2, 0.3, 0.4 or 0.5 wavelengths.

As shown in FIG. 1 through FIG. 6, the splitter 13 defines an installation length D1 along the X-axis direction. The installation length D1 is between 0.1 mm and 1 mm. Particularly, the installation length D1 may be 0.1, 0.2, 0.3, 0.4, 0.5, 0.6, 0.7, 0.8, 0.9 or 1 mm. In the depicted exemplary embodiment, the frequency of the signal source S is 76.5 GHz. If the frequency is not 76.5 GHz, the installation length D1 is between 0.025 and 0.25 wavelengths, and may be 0.025, 0.04, 0.06, 0.08, 0.1, 0.12, 0.14, 0.16, 0.18, 0.2, 0.22, 0.24 or 0.25 wavelengths.

The second main body 20 is located at one side of the first main body 10 that has the two first transmission channels 12. The second main body 20 has two second primary transmission channels 21 communicated with the two first transmission channels 12, respectively, and two second secondary transmission channels 22 flanking the two second primary transmission channels 21. Each of the second primary transmission channels 21 at its one end adjacent to the first main body 10 has a primary receiving hole 211. The primary receiving hole 211 has a hole size equal to a hole size of each of the first transmission channels 12. Each of the second secondary transmission channels 22 is communicated with the second primary transmission channel 21 adjacent thereto through a coupling hole 23. Each of the first radiative signals S1 is split into two second radiative signals S2 through coupling by the coupling hole 23. The two second radiative signals S2 are radiatively output through each of the second primary transmission channels 21 and each of the second secondary transmission channels 22, respectively, in a direction away from the first main body 10.

Figure 4:
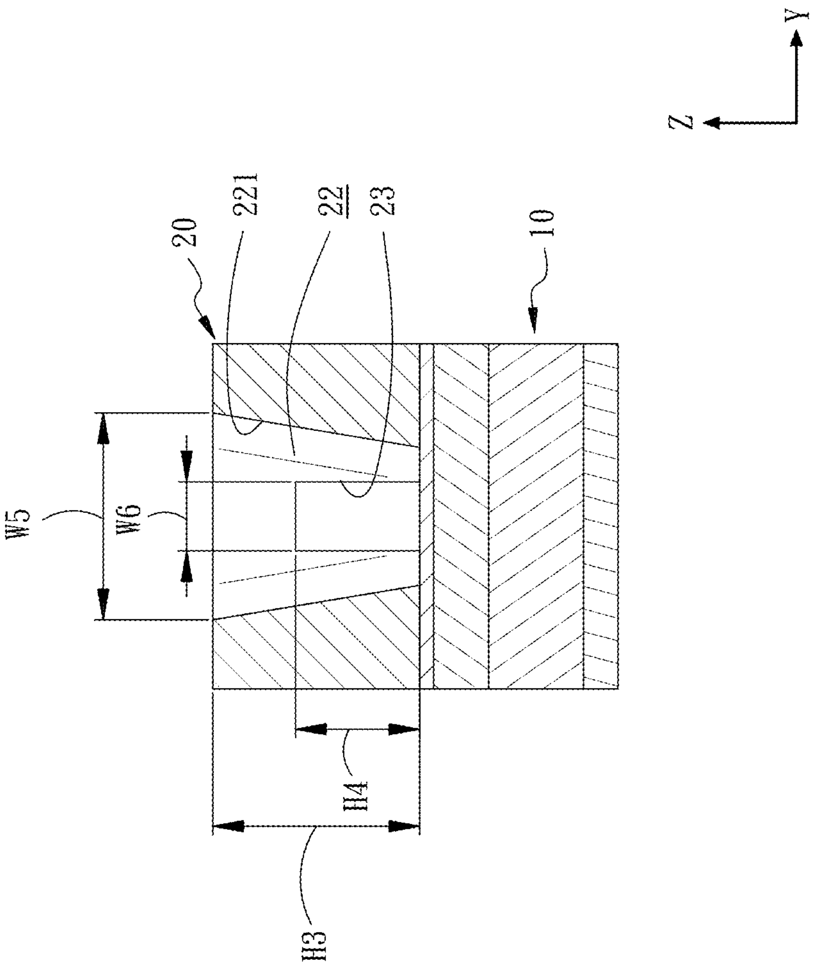
FIG. 4 is a schematic cross-sectional view taken along Line B-B of FIG. 2.
Figure 5:
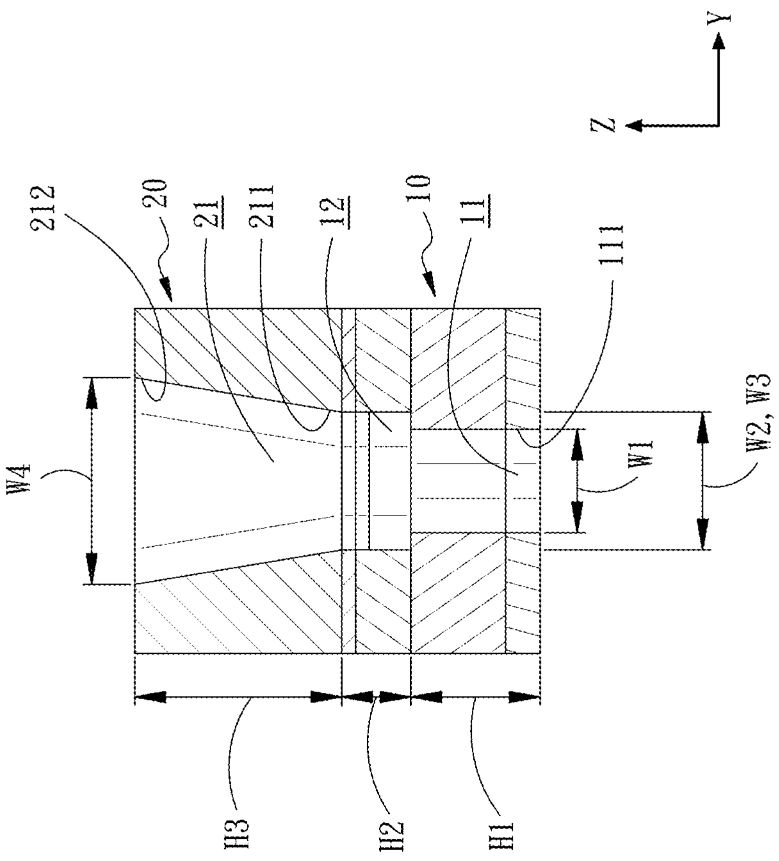
FIG. 5 is a schematic cross-sectional view taken along Line C-C of FIG. 2.
Figure 6:
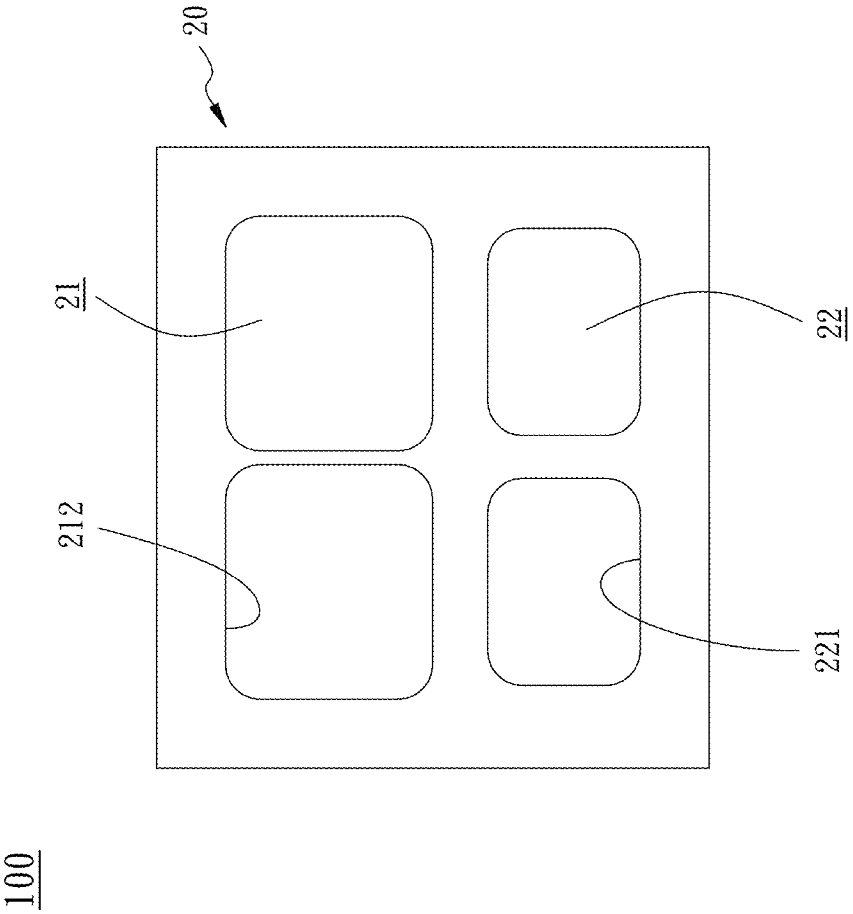
FIG. 6 is a top view of a radar antenna with director according to another embodiment of the present invention.

As shown in FIG. 1 through FIG. 6, the two second primary transmission channels 21 and the two second secondary transmission channels 22 are arranged linearly along the X-axis direction. The two second primary transmission channels 21 are adjacent to each other, and the two second secondary transmission channels 22 are located at opposite sides of the two second primary transmission channels 21. In other embodiments, the two second secondary transmission channels 22 may be each located at one side of the corresponding second primary transmission channel 21 along the Y-axis direction. Particularly, the two second secondary transmission channels 22 may be located at the abreast sides of the two second primary transmission channels 21 to form a U-shaped pattern, as shown in FIG. 6, or may be located at the opposite sides to form a Z-shaped pattern.

As shown in FIG. 1 through FIG. 6, the primary receiving hole 211 defines a third hole length L3 along the X-axis direction. The third hole length L3 is between 2 mm and 7 mm. Particularly, the third hole length L3 may be 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9 or 7 mm. In the depicted exemplary embodiment, the frequency of the signal source S is 76.5

GHz. If the frequency is not 76.5 GHz, the third hole length L3 is between 0.5 and 1.8 wavelengths, and may be 0.5, 0.6, 0.7, 0.8, 0.9, 1.0, 1.1, 1.2, 1.3, 1.4, 1.5, 1.6, 1.7 or 1.8 wavelengths. The primary receiving hole 211 defines a third hole width W3 along the Y-axis direction. The third hole width W3 is between 1 mm and 4 mm. Particularly, the third hole width W3 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 or 4 mm. In the depicted exemplary embodiment, the frequency of the signal source S is 76.5 GHz. If the frequency is not 76.5 GHZ, the third hole width W3 is between 0.25 and 1.02 wavelengths, and may be 0.25, 0.3, 0.4, 0.5, 0.6, 0.7, 0.8, 0.9, 1.0 or 1.02 wavelengths. Particularly, by controlling the third hole length L3 between 2 mm and 7 mm or between 0.5 and 1.8 wavelengths, performance of electromagnetic waves in the E-plane can be effectively controlled, and the angular detection range (−3 dB) can reach about +45 to −45 degrees, thereby obtaining desirable angular detection capability.

Also referring to FIG. 5, each of the second primary transmission channels 21 at its one end away from the first main body 10 has a primary output hole 212. The primary output hole 212 has a hole size greater than that of the primary receiving hole 211. In particular, in the present embodiment, the primary output hole 212 defines a hole width along the Y-axis direction that is greater than the hole width of the primary receiving hole 211 along the Y-axis direction, and a hole width of each of the second primary transmission channels 21 along the Y-axis direction is gradually widened in the direction from the primary receiving hole 211 toward the primary output hole 212.

As shown in FIG. 1 through FIG. 6, the primary output hole 212 defines a fourth hole length L4 along the X-axis direction. The fourth hole length L4 is between 2 mm and 7 mm. Particularly, the fourth hole length L4 may be 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9 or 7 mm. In the depicted exemplary embodiment, the frequency of the signal source S is 76.5 GHz. If the frequency is not 76.5 GHz, the fourth hole length L4 is between 0.5 and 1.8 wavelengths, and may be 0.5, 0.6, 0.7, 0.8, 0.9, 1.0, 1.1, 1.2, 1.3, 1.4, 1.5, 1.6, 1.7 or 1.8 wavelengths. The primary output hole 212 defines a fourth hole width W4 along the Y-axis direction. The fourth hole width W4 is between 1 mm and 5 mm. Particularly, the fourth hole width W4 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 mm. In the depicted exemplary embodiment, the frequency of the signal source S is 76.5 GHz. If the frequency is not 76.5 GHz, the fourth hole width W4 is between 0.25 and 1.28 wavelengths, and may be 0.25, 0.3, 0.4, 0.5, 0.6, 0.7, 0.8, 0.9, 1.0, 1.1, 1.2 or 1.28 wavelengths. Therein, by controlling the fourth hole length L4 and the fourth hole width W4 in the foregoing ranges, performance of electromagnetic waves in the E-plane can be effectively controlled, and the angular detection range (−3 dB) can reach about +45 to −45 degrees, thereby obtaining desirable angular detection capability.

Figure 2:
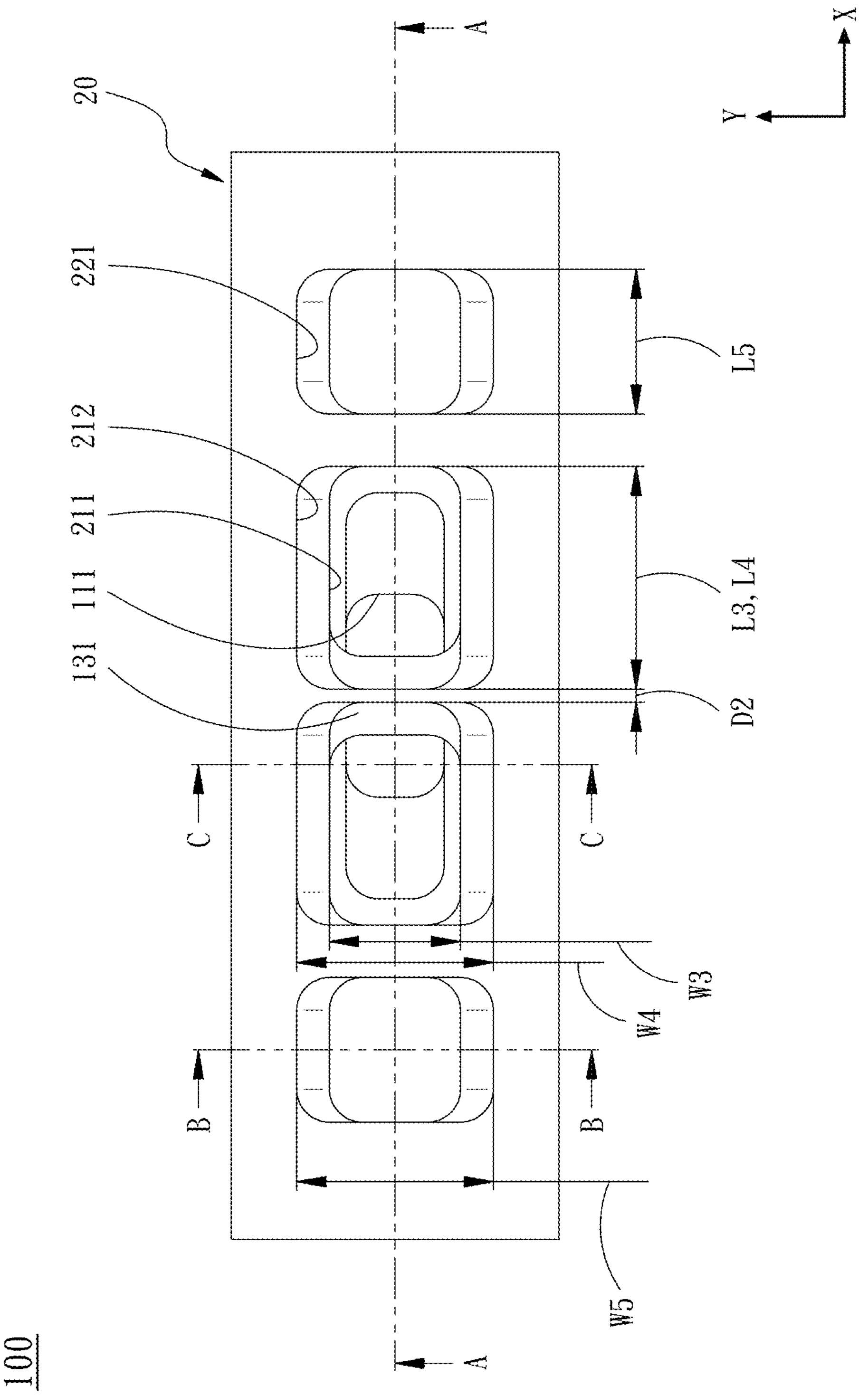
FIG. 2 is a top view of the radar antenna with director according to the embodiment of the present invention.

Also referring to FIG. 2, the adjacent two second primary transmission channels 21 are separated along the X-axis direction by a first interval distance D2. The first interval distance D2 is between 0.1 mm and 0.5 mm. Particularly, the first interval distance D2 may be 0.1, 0.2, 0.3, 0.4 or 0.5 mm. In the depicted exemplary embodiment, the frequency of the signal source S is 76.5 GHz. If the frequency is not 76.5 GHZ, the first interval distance D2 is between 0.025 and 0.128 wavelengths, and may be 0.025, 0.03, 0.04, 0.05, 0.06, 0.07, 0.08, 0.09, 0.1, 0.11, 0.12 or 0.128 wavelengths. Therein, smaller interval distance may result in interference between each signal and occurrence of undesirable coupling, while bigger interval distance may result in an oversized overall component that does not meet the requirement of use.

Also referring to FIG. 4, each of the second secondary transmission channels 22 at its one end away from the first main body 10 has a secondary output hole 221. Each of the second secondary transmission channels 22 defines a hole width along the Y-axis direction that is gradually widened in the direction toward the secondary output hole 221.

As shown in FIG. 1 through FIG. 6, the secondary output hole 221 defines a fifth hole length L5 along the X-axis direction. The fifth hole length L5 is between 1 mm and 5 mm. Particularly, the fifth hole length L5 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 mm. In the depicted exemplary embodiment, the frequency of the signal source S is 76.5 GHz. If the frequency is not 76.5 GHz, the fifth hole length L5 is between 0.25 and 1.28 wavelengths, and may be 0.25, 0.3, 0.4, 0.5, 0.6, 0.7, 0.8, 0.9, 1.0, 1.1, 1.2 or 1.28 wavelengths. The secondary output hole 221 defines a fifth hole width W5 along the Y-axis direction. The fifth hole width W5 is between 1 mm and 5 mm. Particularly, the fifth hole width W5 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 mm. In the depicted exemplary embodiment, the frequency of the signal source S is 76.5 GHz. If the frequency is not 76.5 GHz, the fifth hole width W5 is between 0.25 and 1.28 wavelengths, and may be 0.25, 0.3, 0.4, 0.5, 0.6, 0.7, 0.8, 0.9, 1.0, 1.1, 1.2 or 1.28 wavelengths. Therein, by controlling the fifth hole length L5 and the fifth hole width W5 in the foregoing ranges, performance of electromagnetic waves in the E-plane can be effectively controlled, and the angular detection range (−3 dB) can reach about +45 to −45 degrees, thereby obtaining desirable angular detection capability.

As shown in FIG. 1 through FIG. 6, each of the second primary transmission channels 21 and each of the second secondary transmission channels 22 defines a third transmission length H3 along the Z-axis direction. The third transmission length H3 is between 1 mm and 6 mm. Particularly, the third transmission length H3 may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9 or 6 mm. In the depicted exemplary embodiment, the frequency of the signal source S is 76.5 GHz. If the frequency is not 76.5 GHZ, the third transmission length H3 is between 0.25 and 1.55 wavelengths, and may be 0.25, 0.3, 0.4, 0.5, 0.6, 0.7, 0.8, 0.9, 1.0, 1.1, 1.2, 1.3, 1.4, 1.5 or 1.55 wavelengths. Therein, as the third transmission length H3 affects the phase of signal, efficient control of the third transmission length H3 reaches an effect of consistent phases between different signals.

Figure 3:
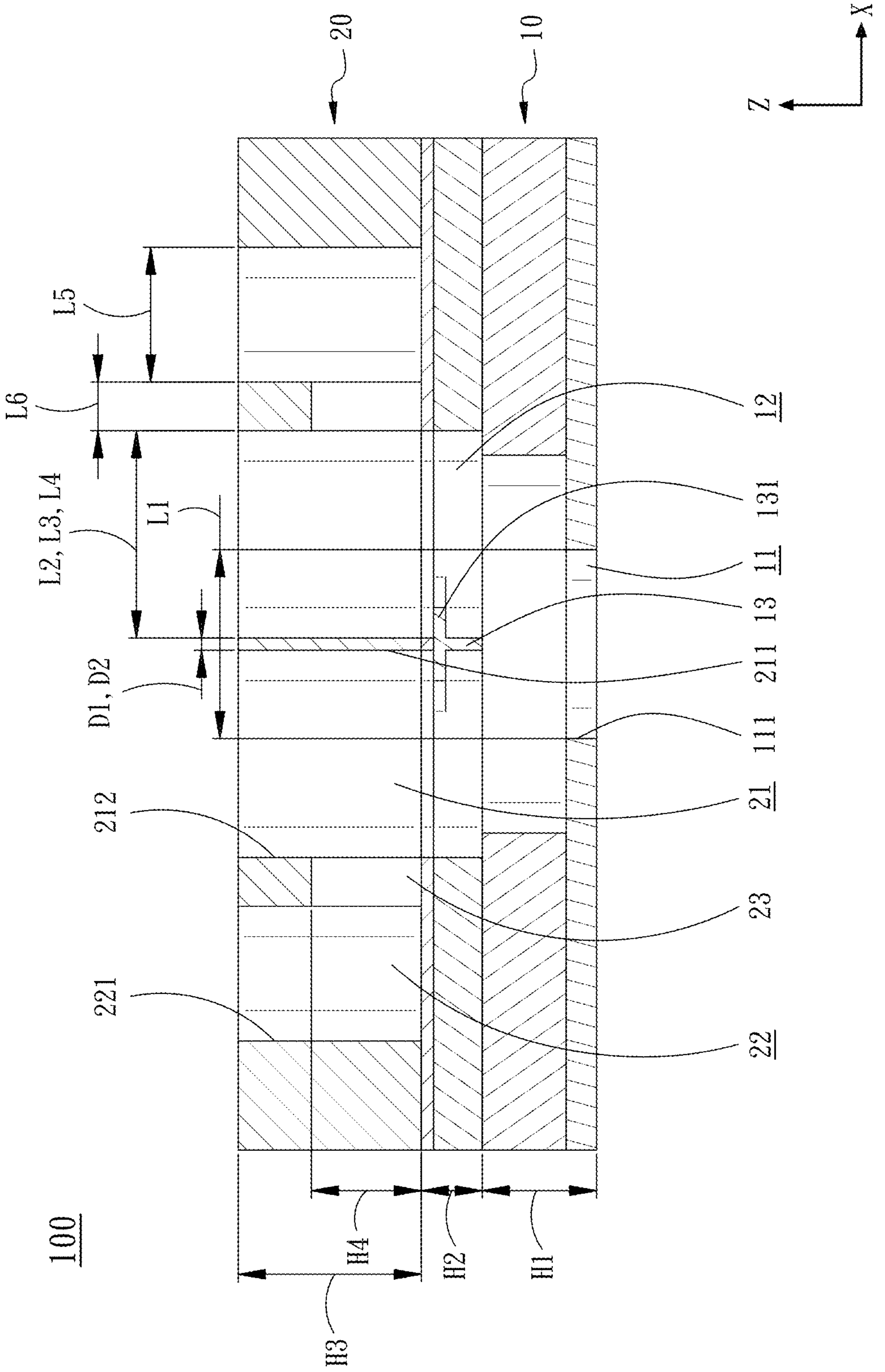
FIG. 3 is a schematic cross-sectional view taken along Line A-A of FIG. 2.

Also referring to FIG. 3, the coupling hole 23 defines a sixth hole length H4 along the Z-axis direction. In the present embodiment, the sixth hole length H4 may be between 0.33 times and 0.46 times of the wavelength of the signal source S, or between 0.33 and 0.46 wavelengths, and may be 0.33, 0.34, 0.35, 0.36, 0.37, 0.38, 0.39, 0.4, 0.41, 0.42, 0.43, 0.44, 0.45 or 0.46 wavelengths. Therein, when the frequency of the signal source S is 76.5 GHz, the sixth hole length H4 is between 1.3 mm and 1.8 mm. For example, the sixth hole length H4 may be 1.3, 1.4, 1.5, 1.6, 1.7 or 1.8 mm. It is to be noted that if the sixth hole length H4 is not in the range between 1.3 mm and 1.8 mm, the radiative signal will not be well coupled and the sidelobes of the radiative signal will not be effectively suppressed.

Additionally, the coupling hole 23 defines a seventh hole length L6 along the X-axis direction. The seventh hole length L6 is between 0.2 mm and 1 mm. Particularly, the seventh hole length L6 may be 0.2, 0.3, 0.4, 0.5, 0.6, 0.7, 0.8, 0.9 or 1 mm. In the depicted exemplary embodiment, the frequency of the signal source S is 76.5 GHz. If the frequency is not 76.5 GHZ, the seventh hole length L6 is between 0.05 and 0.25 wavelengths, and may be 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24 or 0.25 wavelengths. The coupling hole 23 defines a sixth hole width W6 along the Y-axis direction. The sixth hole width W6 is between 0.5 mm and 2 mm. Particularly, the sixth hole width W6 may be 0.5, 0.6, 0.7, 0.8, 0.9, 1, 1.1, 1.2, 1.3, 1.4, 1.5, 1.6, 1.7, 1.8, 1.9 or 2 mm. In the depicted exemplary embodiment, the frequency of the signal source S is 76.5 GHz. If the frequency is not 76.5 GHz, the sixth hole width W6 is between 0.128 and 0.5 wavelengths, and may be 0.128, 0.2, 0.3, 0.4 or 0.5 wavelengths.

Figure 7:
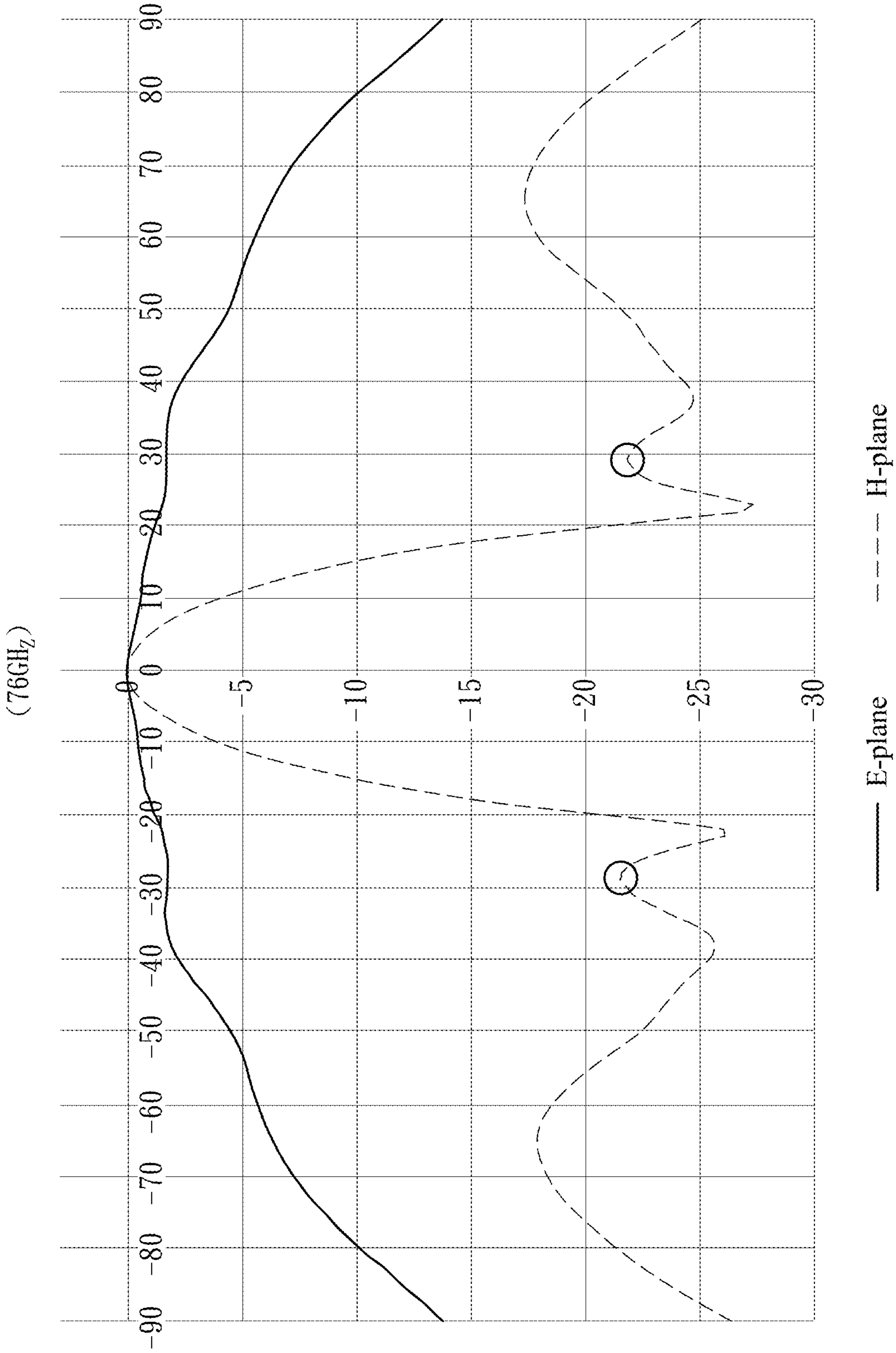
FIG. 7 is a signal gain graph according to one embodiment of the present invention, showing gains at E and H planes with respect to a signal source having a frequency of 76 GHz.
Figure 8:
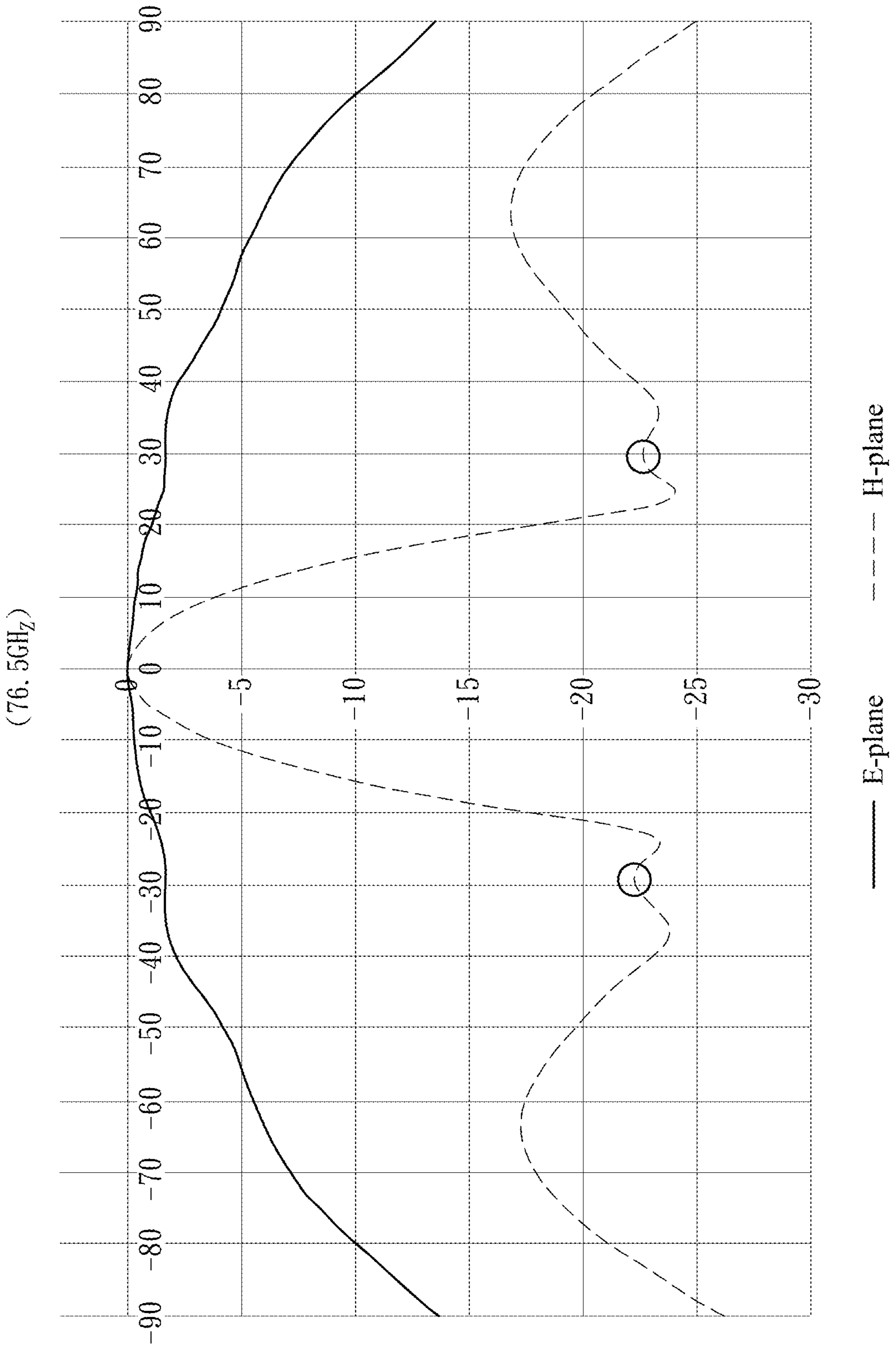
FIG. 8 is a signal gain graph according to one embodiment of the present invention, showing gains at E and H planes with respect to a signal source having a frequency of 76.5 GHz.
Figure 9:
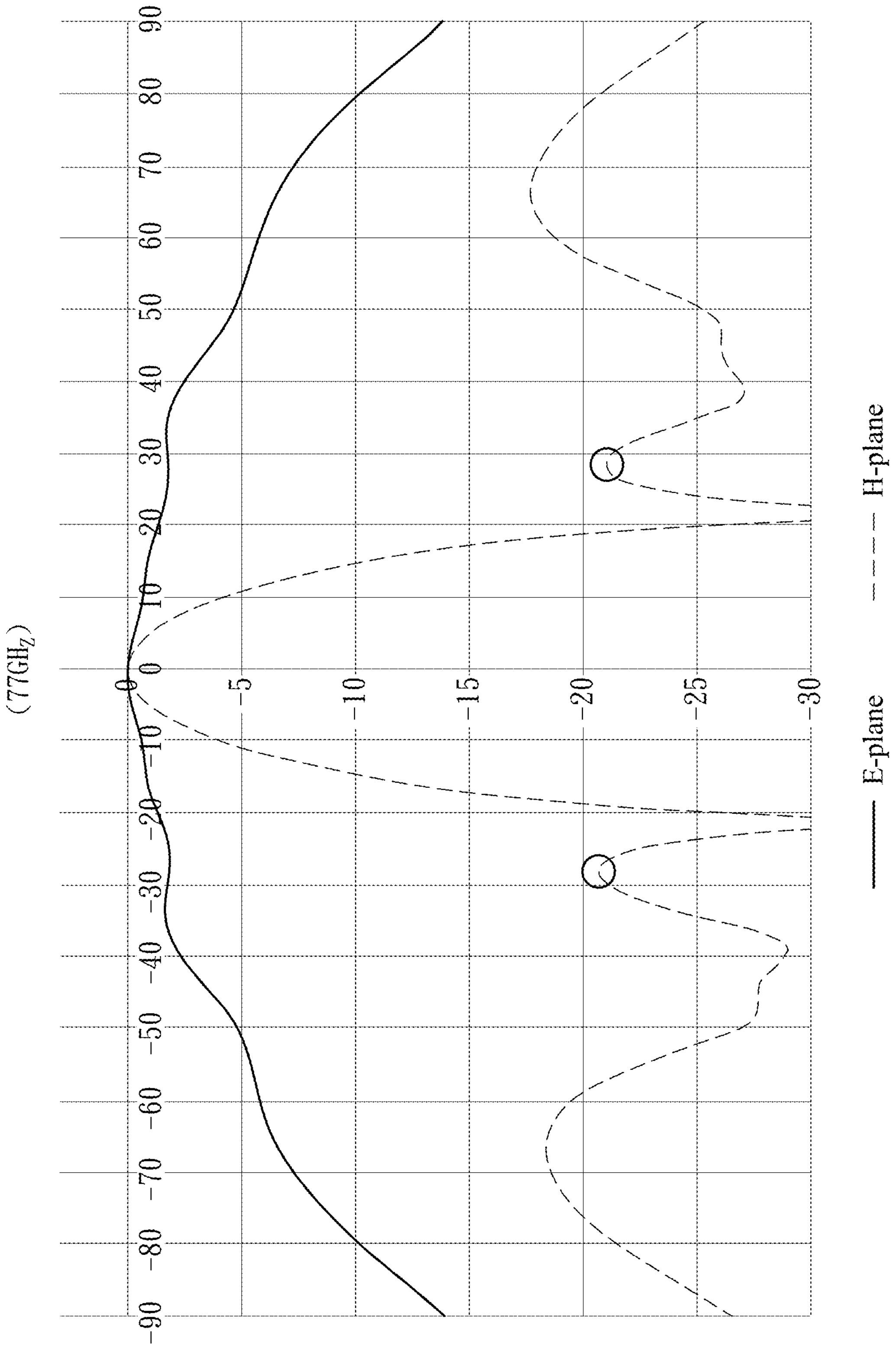
FIG. 9 is a signal gain graph according to one embodiment of the present invention, showing gains at E and H planes with respect to a signal source having a frequency of 77 GHz.

FIG. 7 through FIG. 9 show gains in the E and H planes when the frequency of the signal source S is 76, 76.5, and 77 GHz, respectively. As shown, the strengths of the sidelobes are all below −20 dB (see the circled areas). It is thus clear that when the second radiative signal S2 is transmitted through the structure of the present invention, the energy is relatively concentrated, and the strengths of the sidelobes are relatively low, thereby reducing the probability of degraded precision caused by signal interference due to energy dispersion of the antenna.

Figure 10:
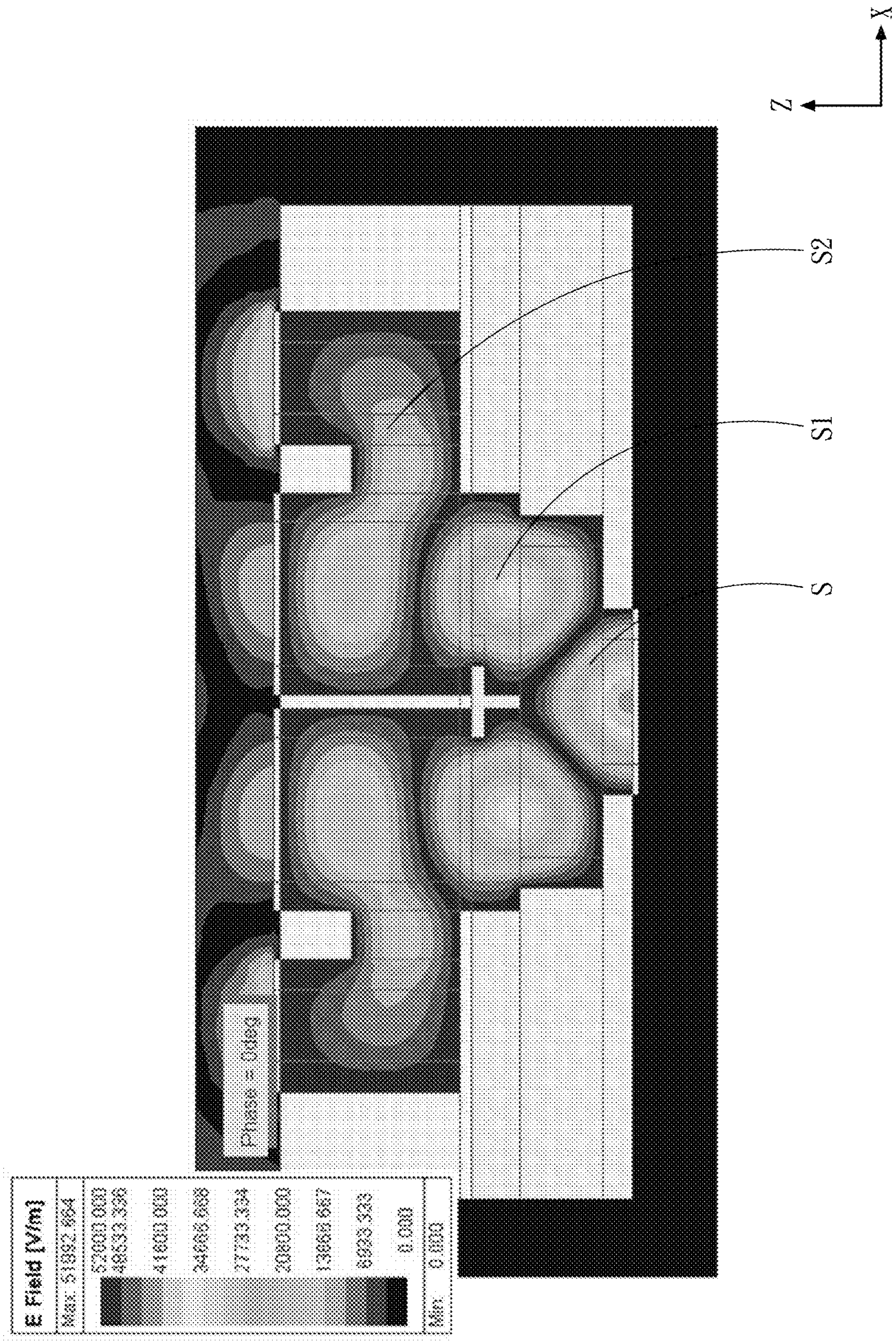
FIG. 10 shows signal transmission according to one embodiment of the present invention.

FIG. 10 shows transmission of the signal source S having a frequency of 76.5 GHz in the disclosed structure. As shown, the two first radiative signals S1 in the two first transmission channels 12 are equal in strength, and the second radiative signals S2 in each of the second primary transmission channels 21 and each of the second secondary transmission channels 22 are also equal in strength, which means that signals transmitted in the disclosed structure always have even strength distribution even after split or coupled.

In the aforementioned embodiments, the size setting of the first hole length L1, second hole length L2, third hole length L3, fourth hole length L4, fifth hole length L5, and seventh hole length L6 is for adjusting the amount of signal energy entered. If the hole length is too long, the signal energy would be unstable; in contrast, if the hole length is too short, it would be difficult for the energy to enter.

In the aforementioned embodiments, the size setting of the first hole width W1, second hole width W2, third hole width W3, fourth hole width W4, fifth hole width W5, and sixth hole width W6 is for adjusting the angular detection range of radar. By setting the hole width in the range of the above-mentioned embodiments, the angular detection range is effectively increased.

With the foregoing configurations, the present invention has the following advantages:

1. With the coupling holes 23, the first radiative signal S1 is coupled when laterally input and is split into the second radiative signals S2. This prevents energy dispersion and reduces energy loss during the process of coupling the first radiative signals S1, so as to decrease sidelobe strengths and maintain signal strengths.

2. The secondary splitting portion 131 helps the splitter 13 to split the signal source S so that the resulting two first radiative signals S1 can be close in phase, thereby preventing phase errors that degrade subsequent signal transmission.

3. By having the second secondary transmission channel 22 smaller than the second primary transmission channel 21 in size, the second radiative signals S2 can be transmitted faster in the second secondary transmission channels 22, so that the two second radiative signals S2 having different transmission distances can be output at the primary output holes 212 and the secondary output holes 221 simultaneously, thereby reducing signal transmission errors.

4. With the coupling hole 23 of the designed size, generation of sidelobes can be effectively prevented or reduced and the four coupled radiative signals can be close in power, thereby eliminating excessive energy differences.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A radar antenna with director, for working with a signal source for radiative transmission, the radar antenna comprising:

a first main body, having a receiving channel and two first transmission channels communicated with the receiving channel, wherein the receiving channel is for receiving the signal source, and a splitter arranged between the two first transmission channels is for splitting the signal source into two first radiative signals and transmitting the two first radiative signals through the two first transmission channels, respectively, a secondary splitting portion raised from two sides of the splitter along an X-axis direction; and a second main body, being located at one side of the first main body that has the two first transmission channels, and comprising two second primary transmission channels communicated with the two first transmission channels, respectively, and two second secondary transmission channels flanking the two second primary transmission channels, wherein each of the second primary transmission channels has one end thereof adjacent to the first main body has a primary receiving hole, which has a hole size equal to a hole size of each of the first transmission channels, and each of the second secondary transmission channels is communicated with the corresponding second primary transmission channel through a coupling hole, whereby each of the first radiative signals is split into two second radiative signals through coupling by the coupling hole, and the two second radiative signals are radiatively output in a direction away from the first main body through the second primary transmission channels and the second secondary transmission channels, respectively, wherein the X-axis direction is perpendicular to the connecting direction of the first main body and the second main body.

2. The radar antenna of claim 1, wherein the receiving channel at one end thereof away from the second main body has a signal receiving hole, which defines a first hole length along the X-axis direction that is between 2 mm and 5 mm, and a first hole width along a Y-axis direction that is between 1 mm and 3 mm; the receiving channel defines a first transmission length along a Z-axis direction that is between 1 mm and 3 mm.

3. The radar antenna of claim 1, wherein each of the first transmission channels defines a second hole length along the X-axis direction that is between 2 mm and 5 mm, a second hole width along a Y-axis direction that is between 1 mm and 4 mm, and a second transmission length along a Z-axis direction that is between 0.5 mm and 2 mm.

4. The radar antenna of claim 1, wherein the splitter defines an installation length along the X-axis direction that is between 0.1 mm and 1 mm.

5. The radar antenna of claim 1, wherein the two second primary transmission channels and the two second secondary transmission channels are arranged linearly along the X-axis direction with the two second primary transmission channels adjacent to each other, and the two second secondary transmission channels are located at opposite outer sides of the two second primary transmission channels.

6. The radar antenna of claim 1, wherein the primary receiving hole defines a third hole length along the X-axis direction that is between 2 mm and 7 mm, and defines a third hole width along a Y-axis direction that is between 1 mm and 4 mm.

7. The radar antenna of claim 1, wherein each of the second primary transmission channels at one end thereof away from the first main body has a primary output hole that has a hole size greater than a hole size of the primary receiving hole.

8. The radar antenna of claim 7, wherein the primary output hole has a hole width along a Y-axis direction greater than a hole width of the primary receiving hole along the Y-axis direction.

9. The radar antenna of claim 8, wherein each of the second primary transmission channels has a hole width along the Y-axis direction gradually widened in a direction from the primary receiving hole toward the primary output hole.

10. The radar antenna of claim 7, wherein the primary output hole defines a fourth hole length along the X-axis direction that is between 2 mm and 7 mm, and defines a fourth hole width along a Y-axis direction that is between 1 mm and 5 mm.

11. The radar antenna of claim 1, wherein the adjacent two second primary transmission channels are separated along the X-axis direction by a first interval distance that is between 0.1 mm and 0.5 mm.

12. The radar antenna of claim 1, wherein each of the second secondary transmission channels at one end thereof away from the first main body has a secondary output hole, and each of the second secondary transmission channels defines a hole width along a Y-axis direction, in which the hole width is gradually widened in a direction toward the secondary output hole.

13. The radar antenna of claim 12, wherein the secondary output hole defines a fifth hole length along the X-axis direction that is between 1 mm and 5 mm, and the secondary output hole defines a fifth hole width along the Y-axis direction that is between 1 mm and 5 mm.

14. The radar antenna of claim 1, wherein each of the second primary transmission channels and each of the second secondary transmission channels defines a third transmission length along a Z-axis direction that is between 1 mm and 6 mm.

15. The radar antenna of claim 1, wherein the coupling hole defines a sixth hole length along a Z-axis direction that is between 0.33 times and 0.46 times of a wavelength of the signal source.

16. The radar antenna of claim 1, wherein the coupling hole defines a seventh hole length along the X-axis direction that is between 0.2 mm and 1 mm, and defines a sixth hole width along a Y-axis direction that is between 0.5 mm and 2 mm.

17. The radar antenna of claim 1, wherein the signal source has a frequency between 75 GHz and 78 GHz.

18. The radar antenna of claim 17, wherein the coupling hole defines a sixth hole length along a Z-axis direction, and when the signal source has a frequency of 76.5 GHz, the sixth hole length is between 1.3 mm and 1.8 mm.

* * * * *